United States Patent
Kao et al.

(10) Patent No.: US 7,251,099 B2
(45) Date of Patent: Jul. 31, 2007

(54) HARD DISK DRIVE TRAY STRUCTURE WITH FLEX CIRCUIT EXTENDING BETWEEN EXPOSED SIDES AND CONNECTED TO METAL PAD AND INDICATOR

(75) Inventors: Chih-Wei Kao, Tao Yuan (TW); Cheng-Cheng Lee, Taipei Shien (TW); Chih-Wei Lee, Tao Yuan (TW)

(73) Assignee: Quanta Computer Inc., Taoyuan Shien (TW)

( * ) Notice: Subject to any disclaimer, the term of this patent is extended or adjusted under 35 U.S.C. 154(b) by 555 days.

(21) Appl. No.: 10/873,119

(22) Filed: Jun. 23, 2004

(65) Prior Publication Data

US 2005/0135000 A1    Jun. 23, 2005

(30) Foreign Application Priority Data

Dec. 22, 2003   (TW) ............................. 92136452 A

(51) Int. Cl.
G11B 33/12 (2006.01)
G11B 33/10 (2006.01)
G11B 25/04 (2006.01)
G11B 17/03 (2006.01)
H05K 5/02 (2006.01)

(52) U.S. Cl. .............................. 360/97.01; 360/99.06; 361/685

(58) Field of Classification Search ............. 360/97.01, 360/97.02, 97.03, 98.01, 99.06, 99.07, 99.12; 361/685
See application file for complete search history.

(56) References Cited

U.S. PATENT DOCUMENTS

| 3,873,889 A * | 3/1975 | Leyba ........................ 361/681 |
| 5,734,549 A * | 3/1998 | Oura ........................... 361/685 |
| 5,784,644 A * | 7/1998 | Larabell ........................ 710/9 |
| 6,392,872 B1* | 5/2002 | Doustou et al. ........... 361/681 |
| 2002/0027743 A1* | 3/2002 | Haitani .................... 360/99.01 |
| 2002/0084908 A1* | 7/2002 | Los et al. .................. 324/556 |
| 2004/0222785 A1* | 11/2004 | Los et al. ............... 324/158.1 |

* cited by examiner

Primary Examiner—Craig A. Renner
(74) Attorney, Agent, or Firm—Rabin & Berdo, PC

(57) ABSTRACT

A HDD tray structure is disclosed. The HDD tray structure includes a tray housing, a flexible printed circuit board (FPC) installed on the tray housing, and at least one indicator, wherein one end of the FPC has a metal pad electrically connected to a connector of a printed circuit board, and the other end of the FPC is in electrical contact with the indicator, so as to control the on/off state of the indicator.

9 Claims, 2 Drawing Sheets

HARD DISK DRIVE TRAY STRUCTURE WITH FLEX CIRCUIT EXTENDING BETWEEN EXPOSED SIDES AND CONNECTED TO METAL PAD AND INDICATOR

FIELD OF THE INVENTION

The present invention relates to a HDD (Hard Disk Drive) tray structure, and more particularly, to the HDD tray structure with a FPC (Flexible Printed Circuit Board) for controlling an indicator of the HDD tray.

BACKGROUND OF THE INVENTION

A hard disk drive is quite an important information storage apparatus for a computer product, and more and more computers are equipped with more than two hard disk drives, so that the indicators (indicating lights) have become essential devices for showing the statuses of the hard disk drives. For installing or removing the hard disk drives conveniently and safely, each of the hard disk drives is placed in a HDD tray, so that the HDD tray is a proper place to install the indicators for the hard disk drives.

Plastic light pipes are used to guide light in the conventional technology for lighting the HDD indicators. However, since the light pipes are restricted by space and turning angles, it is not easy to guide the light to the front with the light pipes. With the addition of the other wire connecting devices, the design becomes more difficult to install the light pipes and wirings on the HDD tray for controlling the HDD indicators. Hence, considering the HDD tray having limited space, how to effectively simplify the design of controlling the HDD indicators has become quite an important topic on the HDD tray design.

Further, the HDD tray is required to have the function of protecting the hard disk drive located therein, and vibration is one of the important factors of damaging the hard disk drive. Therefore, how to effectively enhancing the shock-absorbing function of the HDD tray is also an important topic on the HDD tray design.

Hence, there is a need to develop a HDD tray structure for effectively simplifying the design of controlling the HDD indicators; and enhancing the shock-absorbing function of the HDD tray, thereby reducing the manufacturing cost and increasing the protection for the hard disk drive.

SUMMARY OF THE INVENTION

It is an object of the present invention to provide a HDD tray structure for simplifying the manufacturing steps by using a FPC to control the indicators of the HDD tray, thereby lowering the manufacturing cost.

It is the other object of the present invention to provide a HDD tray structure for enhancing the shocking-absorbing function by using the design of metal elastic plates and rubble pads.

According to the aforementioned objects of the present invention, the present invention provides a HDD tray structure for controlling indicators of a HDD tray.

According to a preferred embodiment of the present invention, the HDD tray structure comprises: a tray housing, a flexible printed circuit board (FPC) and at least one indicator. The tray housing has a bottom side and a first side, a second side, a third side and a fourth side sequentially surrounding the bottom side, wherein the first side is parallel to the third side, and the second side is parallel to the fourth side. The FPC extends from a first position to a second position, wherein the first position is exposed from the second side, and the second position is exposed from the fourth side. A metal pad is installed on the second position and the metal pad is electrically connected to a connector on a printed circuit board. The indicator is in electrical contact with the first position, and the indicator can be located on an outer cover, wherein the outer cover covers the second side.

Further, the HDD tray structure further comprises: at least one pair of metal elastic plates and a plurality of rubber pads, wherein the metal elastic plates are installed respectively on the external surfaces of the first and third sides to achieve the shock-absorbing function. The rubber pads are installed respectively on the space between the metal elastic plate and the first side; and that between the metal elastic plate and the third side.

Hence, with the application of the present invention, the design for controlling the indicators of the HDD tray can be greatly simplified, and the shock-absorbing function of the HDD tray can be enhanced, so that the production cost can be lowered and the function of protecting a HDD with the HDD tray can be further promoted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A flexible printed circuit board (FPC) is one of the popular devices recently, and the function thereof is to hold copper plate circuits. The FPC has the features of light weight, soft and thin material, small volume, good ductility, high wiring density, good wiring capability in 3-D space and excellent flexibility in shape in accordance with the space limitation. Hence, the FPC is widely applied in the products, such as notebook computers, mobile phones, personal digital assistants (PDAs) and digital information appliances (IAs), etc. With respect to the functions, the FPC includes four types: a lead line, a printed circuit, a connector and a multi-function integrating system.

The present invention is featured in using a FPC to control the indicators of a HDD tray.

Figure 1:
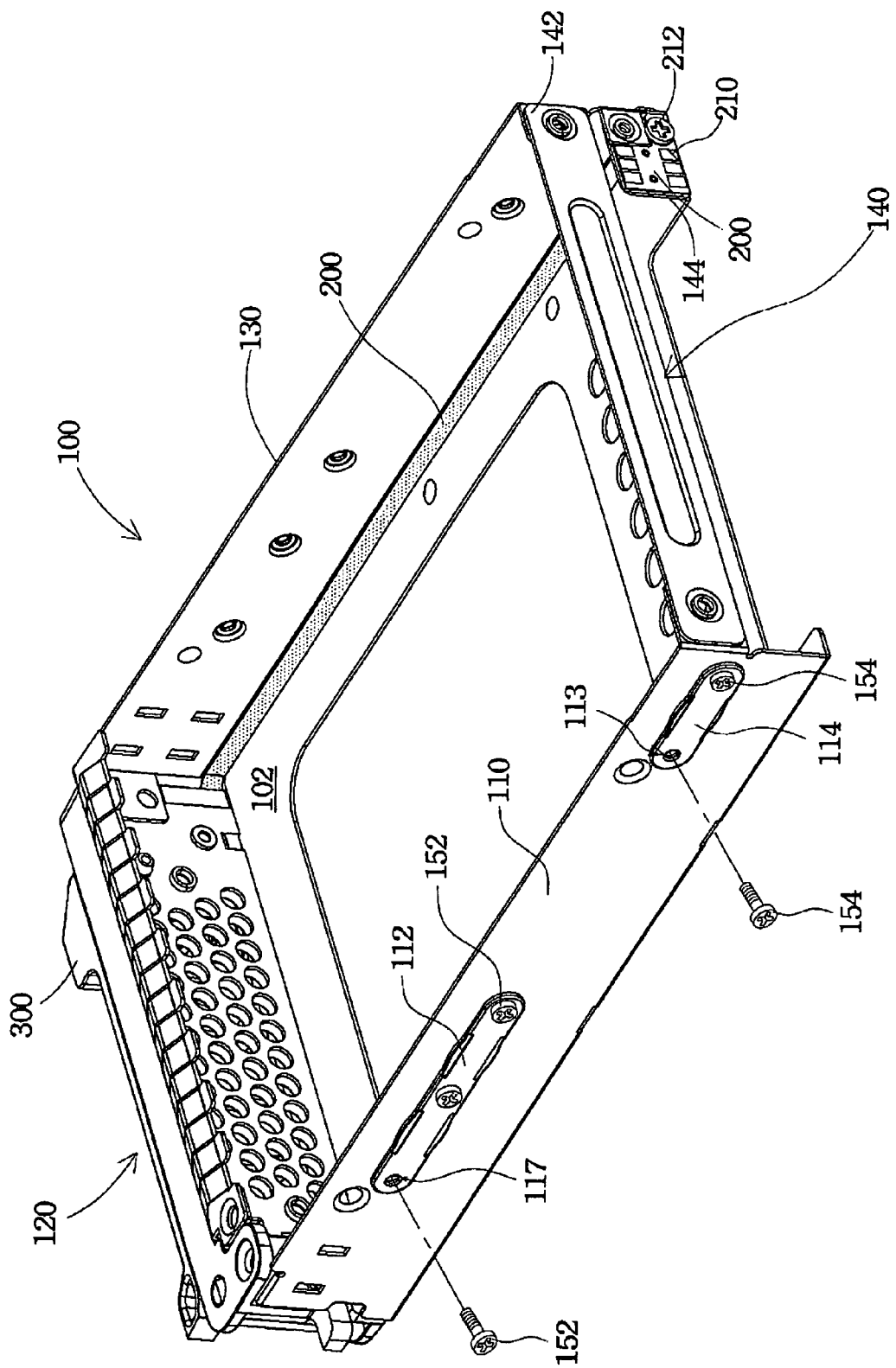
FIG. 1 is a 3-D schematic diagram depicting a HDD tray structure of the present invention.
Figure 2:
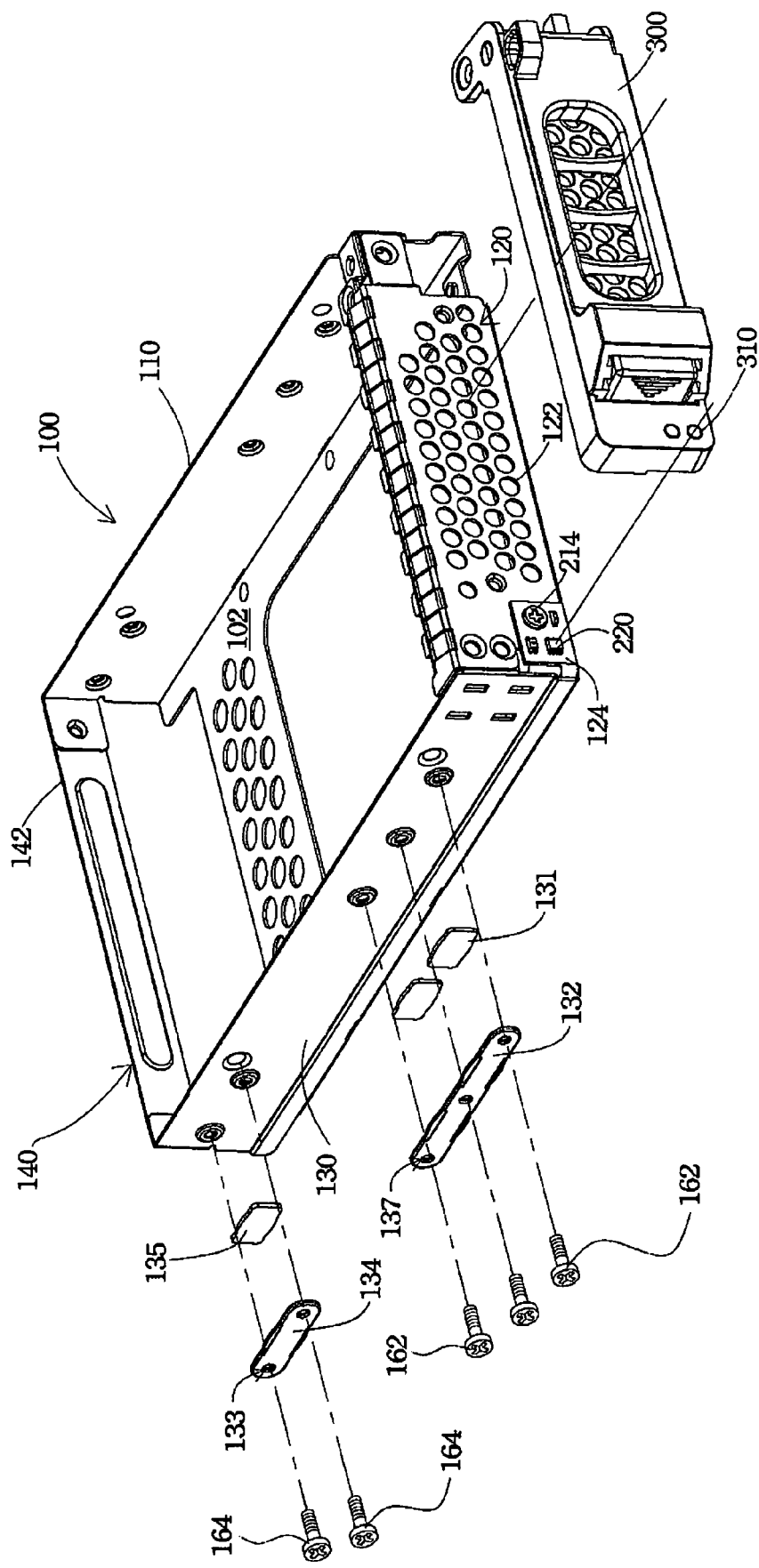
FIG. 2 is an explosive schematic diagram showing the combination of an outer cover, metal elastic plates and the HDD tray, according to the present invention.

Referring to FIG. 1 and FIG. 2, FIG. 1 is a 3-D schematic diagram depicting a HDD tray of the present invention, and FIG. 2 is an explosive schematic diagram showing an outer cover, metal elastic plates and the HDD tray, according to the present invention. The HDD tray structure is composed of a tray housing 100, a flexible printed circuit board (FPC) 200 and at least one indicator 310. The tray housing 100 has a bottom side 102 and a first side 110, a second side 120, a third side 130 and a fourth side 140 sequentially surrounding and perpendicular to the bottom side 102, wherein the first side 110 is parallel to the third side 130, and the second side 120 is parallel to the fourth side 140. The second side 120 is composed of a first side portion 122 and a second side portion 124 (as shown in FIG. 2), and the fourth side 140 is composed of a third side portion 142 and a fourth side portion 144 (as shown in FIG. 1).

The FPC 200 is installed on an interior side of the third side 130 adjacent to the bottom side 102, and extends from a contact point 220 (as shown in FIG. 2) through the aforementioned interior side to a position exposed from the fourth side portion 142, wherein the contact point 220 is exposed from the second side 120, and is located on the second side portion 124. A metal pad 210 (as shown in FIG. 1) is installed on the position located on the third side portion 142, and the metal pad 210 is electrically connected to a connector (not shown) located on a printed circuit board. As shown in FIG. 2, the indicator 310 is electrically connected to the contact point 220 of the FPC 200 located on the second side portion 124, and the indicator 310 can be located on a cover 300, wherein the cover 300 is used for covering the second side 120. When and HDD is stored in the tray housing 100, with the use of the implementation of aforementioned FPC 200, a HDD indication signal can be transmitted to the contact point 220 via the metal pad 210, and then the on/off state of the indicator 310 can be controlled via the contact between the contact point 220 and the indicator 310.

It is worthy to be noted that the FPC 200 can be secured to the fourth side portion 144 with a fixing element 212 (as shown in FIG. 1), and secured to the second side portion 124 with a fixing element 214 (as shown in FIG. 2). Further, the FPC 200 can also be adhered to the related surfaces of the tray housing 100 with an adhesive (not shown).

Further, the other feature of the present invention is to use the combination of metal elastic plate and rubber pad to enhance the shock-absorbing function of the HDD tray.

Such as shown in FIG. 2, the present invention secures metal elastic plates 134 and 132 to the third side 130 of the tray housing 100 with locking elements 164 and 162 penetrating through locking holes 133 and 137, wherein a rubber pad 135 is inserted between the metal elastic plate 134 and the third side 130; and a rubber pad 131 is inserted between the metal elastic plate 132 and the third side 130. Similarly, such as shown in FIG. 1, the present invention secures metal elastic plates 114 and 112 to the first side 110 of the tray housing 100 with locking elements 154 and 152 penetrating through locking holes 113 and 117, wherein a rubber pad (not shown) is inserted between the metal elastic plate 114 and the first side 110; and a rubber pad (not shown) is inserted between the metal elastic plate 112 and the first side 110. When the sides of the tray housing 100 have vibration due to pressing (squeezing), the aforementioned metal elastic plates and the rubber pads will absorb the pressing force, thereby performing the shock-absorbing function, thus preventing the HDD stored in the tray housing 100 from being damaged.

To sum up, the FPC of the present invention occupies small space, and is flexible to be curved easily, so that the present invention can overcome the shortcoming of the conventional technology having the difficulty of directing the light to the front, since the plastic light pipes used in the conventional technology are restricted by space and turning angles. Further, the design of metal elastic plates and rubber pads has excellent shock-absorbing function. Hence, the present invention has highly industrial application value.

It can be known from the aforementioned preferred embodiment of the present invention, the advantages of applying the present invention are: greatly simplifying the design of controlling the HDD indicators without being restricted by space; and effectively promoting the shock-absorbing function of the HDD tray, thus further enhancing the HDD protection.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A HDD (Hard Disk Drive) tray structure, comprising:
   a tray housing, wherein said tray housing has a bottom side, and a first side, a second side, a third side and a fourth side sequentially surrounding said bottom side, and said first side is parallel to said third side, and said second side is parallel to said fourth side;
   a flexible printed circuit board (FPC) set on said tray housing, wherein said FPC extends from a first position, through an interior side of said third side adjacent to said bottom side, to a second position, wherein said first position is exposed from said second side, and said second position is exposed from said fourth side, and a metal pad is installed on said second position, and said metal pad is electrically connected to a connector on a printed circuit board; and
   at least one indicator, in electrical contact with said FPC.

2. The HDD tray structure of claim 1, wherein said FPC is installed on said HDD tray structure with at least one fixing element.

3. The HDD tray structure of claim 2, wherein said fixing element is a screw.

4. The HDD tray structure of claim 1, wherein said FPC is installed on said HDD tray structure with an adhesive.

5. The HDD tray structure of claim 1, further comprising:
   at least one pair of metal elastic plates, respectively installed on an exterior side of said first side and said third side for achieving a shock-absorbing function.

6. The HDD tray structure of claim 5, further comprising:
   a plurality of rubber pads, respectively inserted between said metal elastic plates and said first side, and between said metal elastic plates and said third side.

7. The HDD tray structure of claim 5, wherein said metal elastic plates are installed on said first side and said third side with a plurality of locking elements.

8. The HDD tray structure of claim 7, wherein said locking elements are screws.

9. The HDD tray structure of claim 1, wherein said indicator is located on an outer cover, said outer cover covering said second side.

* * * * *